United States Patent [19]

Trevelyan et al.

[11] Patent Number: 5,370,723
[45] Date of Patent: Dec. 6, 1994

[54] GLASS MELTING FURNACE WITH CONTROL OF THE GLASS FLOW IN THE RISER

[75] Inventors: Robert E. Trevelyan, Wigan; Peter J. Whitfield, St. Helens, both of United Kingdom

[73] Assignee: Pilkington PLC, St. Helens, United Kingdom

[21] Appl. No.: 196,808

[22] Filed: Feb. 15, 1994

Related U.S. Application Data

[60] Continuation of Ser. No. 943,690, Sep. 11, 1992, abandoned, which is a division of Ser. No. 758,250, Sep. 11, 1991, Pat. No. 5,194,081, which is a continuation of Ser. No. 536,750, Jun. 12, 1990, abandoned.

[30] Foreign Application Priority Data

Jun. 13, 1989 [GB] United Kingdom ............. 8913539

[51] Int. Cl.⁵ ............................................. C03B 5/03
[52] U.S. Cl. ..................................... 65/346; 65/347
[58] Field of Search ........... 65/347, 335, 339, 346, 65/DIG. 13

[56] References Cited

U.S. PATENT DOCUMENTS

| | | | |
|---|---|---|---|
| 3,140,334 | 7/1964 | Penberthy | 65/347 |
| 3,676,099 | 7/1972 | Fultz . | |
| 3,897,234 | 7/1975 | Froberg | 65/135 |
| 3,954,433 | 5/1976 | Holler . | |
| 3,997,315 | 12/1976 | Rhodes et al. . | |
| 4,012,218 | 3/1977 | Sorg | 65/347 |
| 4,028,083 | 6/1977 | Patznick et al. . | |
| 4,375,369 | 3/1983 | Border | 65/DIG. 13 |
| 4,405,351 | 9/1983 | Sheinkop . | |
| 4,424,071 | 1/1984 | Steitz et al. . | |
| 4,693,740 | 9/1987 | Noiret et al. . | |
| 4,900,337 | 2/1990 | Zortea et al. . | |
| 4,929,266 | 5/1990 | Cozac et al. . | |
| 4,961,772 | 10/1990 | Duly | 65/339 |
| 5,078,777 | 1/1992 | Cozac | 65/347 |

FOREIGN PATENT DOCUMENTS

| | | |
|---|---|---|
| 20363/83 | 5/1984 | Australia . |
| 31751/84 | 2/1985 | Australia . |
| 74005/87 | 5/1991 | Australia . |
| 0304371 | 2/1989 | European Pat. Off. . |
| 3718276 | 12/1988 | Germany . |
| 250536 | 2/1926 | United Kingdom . |
| 1121778 | 7/1968 | United Kingdom . |
| 1480935 | 7/1977 | United Kingdom . |

OTHER PUBLICATIONS

"Glass Furnaces Design Construction and Operation," Wolfgang Trier, translated by Loewenstein (Society of Glass Technology, Sheffield, 1987) pp. 156,157.
"Electric Melting of Glass," Jaroslav Stanek, Glass Science and Technology, 1 (Elsevier Scientific Publishing Company, 1977) pp. 184–185, 188–189.
The Handbook of Glass Manufacture, 3rd Ed., vol. 1, Ed. by Fay V. Tooley, 1984, Ashlee Publishing Co. (New York), pp. 299–301.

*Primary Examiner*—W. Gary Jones
*Assistant Examiner*—John Hoffmann
*Attorney, Agent, or Firm*—Howrey & Simon

[57] ABSTRACT

A glass melting tank has a melting chamber, a shallow uniflow conditioning chamber, a shallow refining chamber and a riser chamber between the melting chamber and refining chamber. Heat is input to glass in the riser chamber by electrodes located centrally in the riser chamber near the base of the riser chamber. Temperature sensors sense the temperature entering the riser chamber through a throat and near the base of a downstream wall of the riser chamber and the heat input is controlled to produce torroidal flow in the riser chamber.

11 Claims, 4 Drawing Sheets

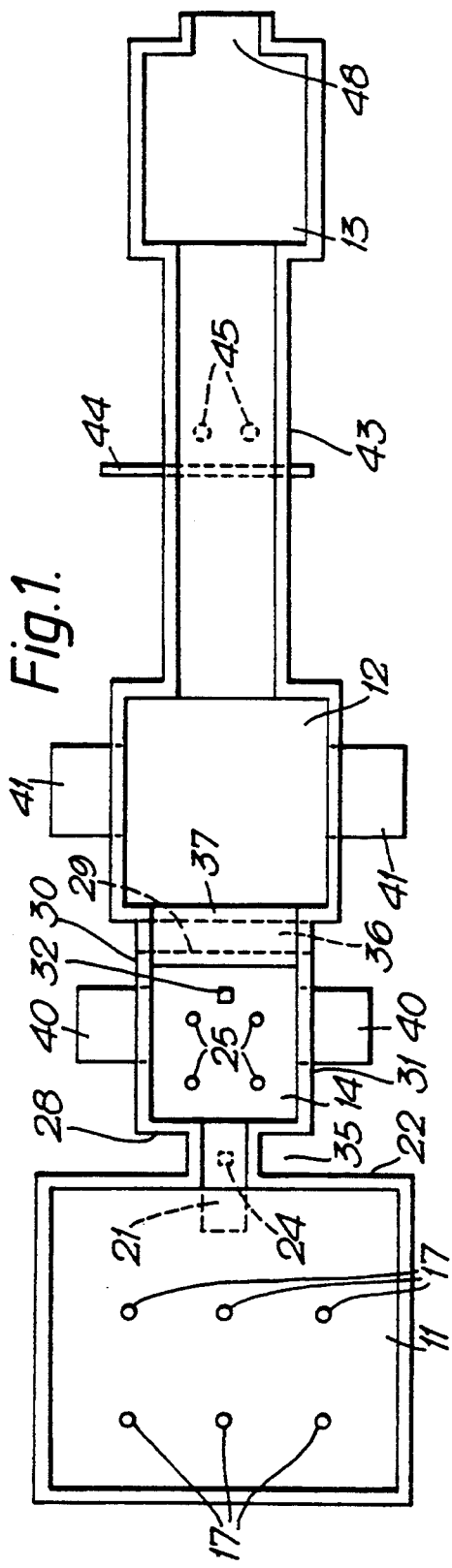
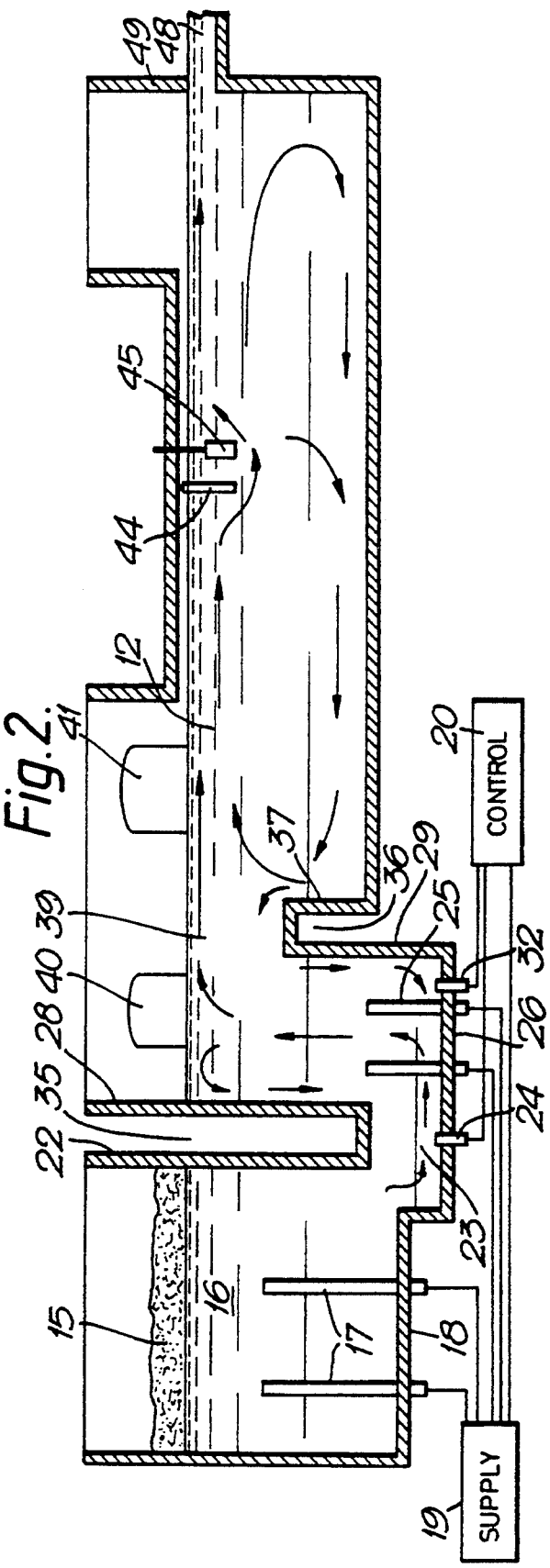

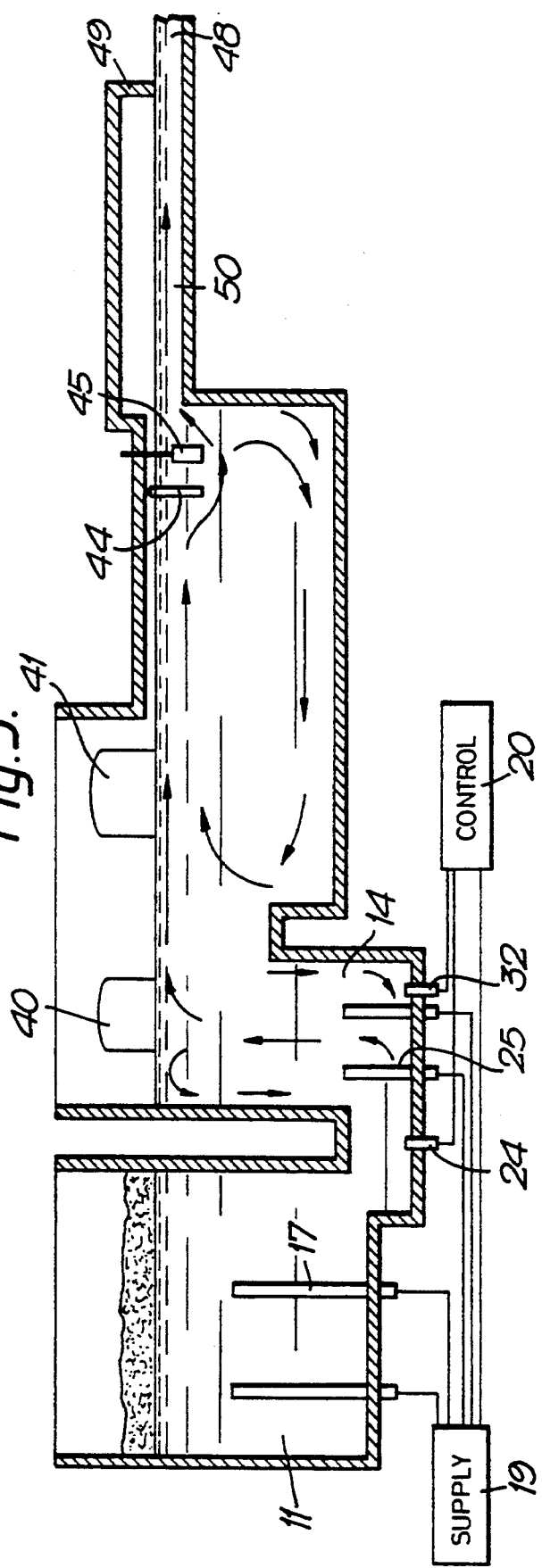

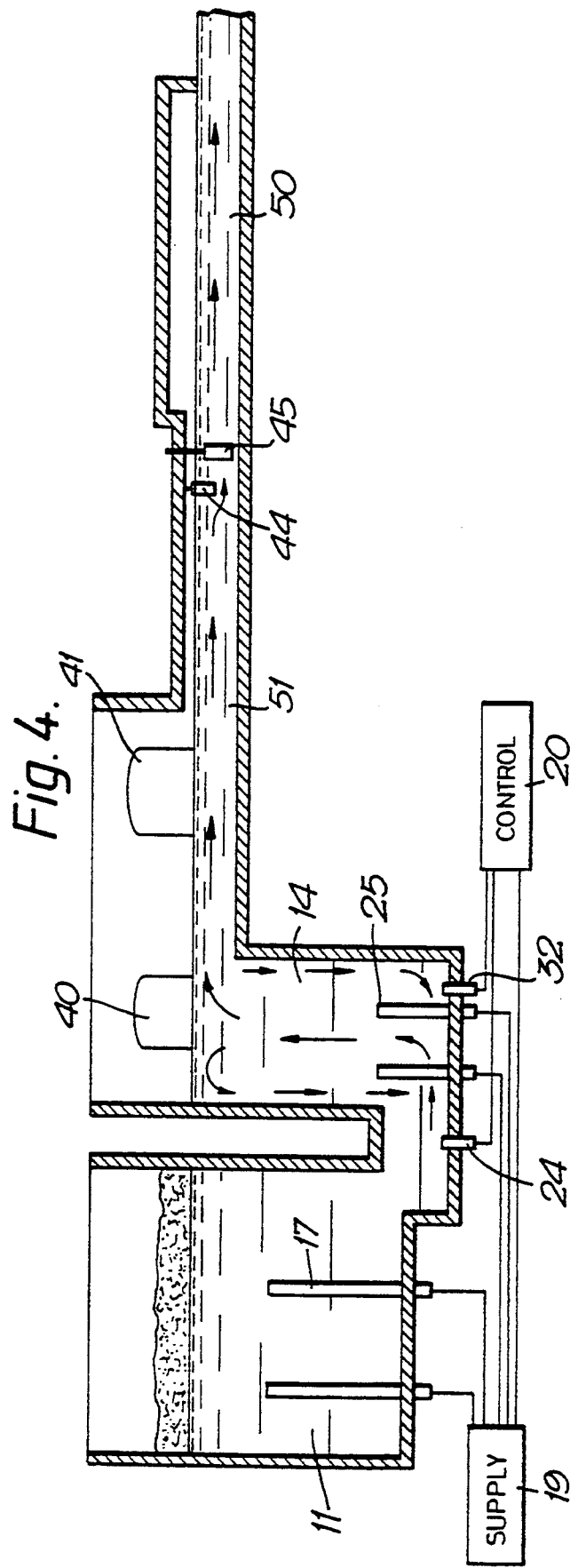

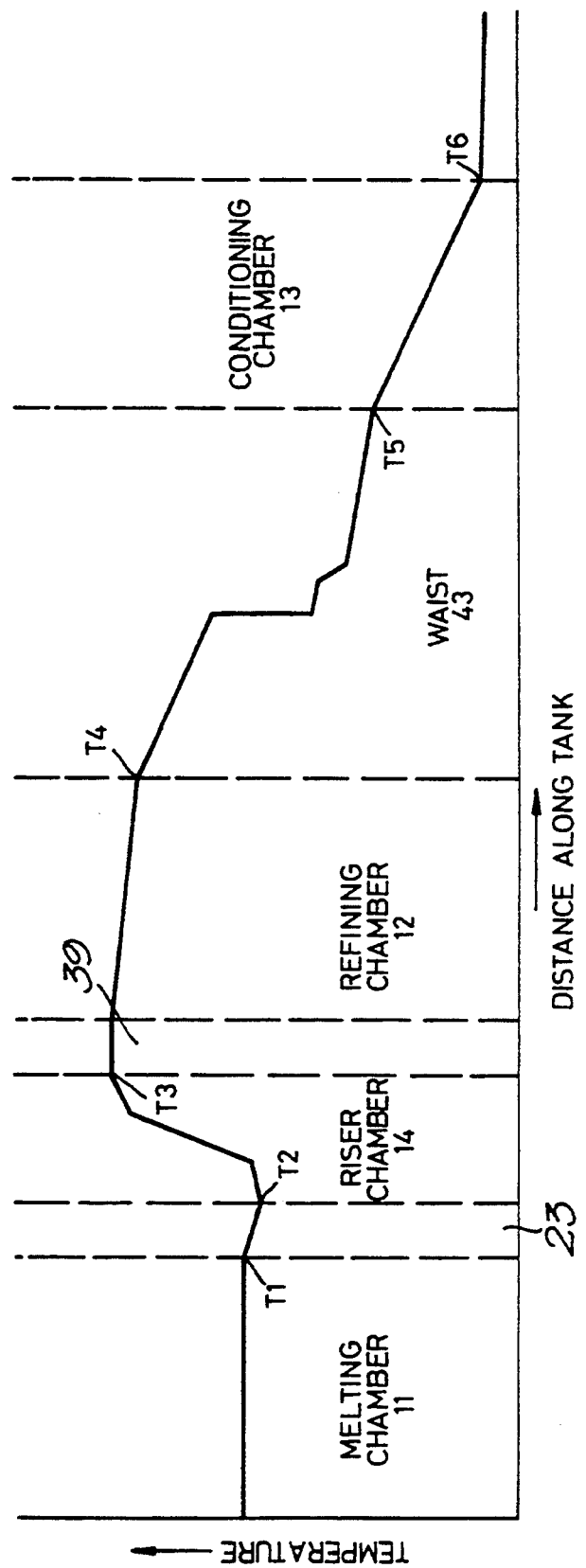

GLASS MELTING FURNACE WITH CONTROL OF THE GLASS FLOW IN THE RISER

This application is a continuation of application Ser. No. 07/943,690, filed on Sep. 11, 1992, abandoned which is a division of application Ser. No. 07/758,250 filed Sep. 11, 1991 U.S. Pat. No. 5,194,081 which is a continuation of application Ser. No. 07/536,750, abandoned filed Jun. 12, 1990.

This invention relates to glass melting and is particularly directed to glass melting tanks using electric heating.

BACKGROUND OF THE INVENTION

It is well known for glass melting tanks to include a melting chamber in which solid batch material is heated to produce molten glass before entering a refining chamber in which the molten glass is at a sufficiently high temperature for refining to occur and thereby reduce defects due to impurities or bubble in the glass. Commonly the glass passes from a refining chamber through a conditioning zone in which thermal conditioning by controlled cooling is effected prior to glass leaving the tank through an outlet to a forming process. Such tanks may be used for continuous production of molten glass and are particularly applicable to the production of high quality glass for use in the production of flat glass.

When solely electric heating is used in a melting chamber of such a tank it is normal for the molten glass in the melting chamber to be covered by a cold top of solid batch material which is progressively melted by heat from electrodes immersed in the glass in the melting chamber. The flow path for molten glass from the melting chamber to a refining chamber, when using electric melting may be through a throat located adjacent the base of the melting chamber in order to reduce the probability of unmelted batch material being carried with the molten glass into the refining zone.

It is common in flame fired furnaces for the molten glass in a refining chamber to be sufficiently deep to permit recirculation of molten glass in convective flows so that the upper layers of glass in the refining zone are flowing towards a downstream end of the zone with a return flow in the lower region of the refining chamber.

It is known to provide a riser chamber after the melting chamber. It is also known to provide heating in such a riser chamber. However, serious problems can arise from unwanted corrosion of refractory walls of the riser chamber by the upward flowing glass, particularly where the riser chamber is increasing the temperature of the molten glass to a suitable refining temperature above that of the glass entering from the melting chamber, such as may be necessary in the production of high quality flat glass.

It is also known, for example from FIGS. 1 and 2 of U.S. Pat. No. 4,900,337, to use electrodes in a riser chamber forming a conditioning chamber following a throat from a melting chamber. However conditioning involves controlled cooling where electrodes are used to control the rate of loss of temperature of the molten glass rather than raising the temperature above that of the glass leaving the melting chamber. Where the temperature is not raised after passing through the throat into the riser the problems of corrosion in the riser are less severe due to the lower temperatures employed. Such arrangements where the glass temperature is not increased after leaving the melting chamber are more suitable for making glass for containers or fibre glass but may not provide the necessary refining for high quality flat glass production such as that used for a float glass production line.

SUMMARY OF THE INVENTION

It is an object of the present invention to provide an improved glass melting tank and an improved method of melting glass which reduces the problem of corrosion in a riser chamber, where glass temperature is increased after leaving a melting chamber. Such arrangements may be used for the production of high quality flat glass.

The present invention provides a method of forming molten glass in a glass melting tank, which method comprises heating batch material in a melting chamber to produce molten glass, refining the molten glass in a refining zone and thermally conditioning the glass prior to causing the glass to flow continuously through an outlet from the tank, said method further comprising causing the molten glass to flow through a riser chamber between the melting chamber and the refining chamber, the glass entering the riser chamber through a throat at the base of the riser chamber and leaving the riser chamber through an outlet at its upper end, the glass being heated in the riser chamber in a central zone spaced from the walls of the riser chamber whereby an inhomogeneous temperature distribution is formed in the glass across the riser chamber and molten glass is caused to flow upwardly in said central zone of the riser chamber with downward glass flow adjacent said chamber walls, the heat input to the glass in the riser chamber being such as to raise the temperature of the glass in the riser chamber and to maintain a glass temperature adjacent the base of the riser chamber opposite said throat which is above the temperature of glass entering the riser chamber through the throat.

Preferably the flow through the riser chamber is toroidal with upward flow in the centre of the toroid and downward flow around the outside of the toroid.

Preferably the method includes sensing the temperature of glass in said throat and sensing the temperature of glaas adjacent the base of the riser chamber opposite said throat.

Preferably the method includes cooling upstream and downstream walls of said riser chamber.

Preferably heat is applied to glass in the riser chamber by a plurality of electrodes projecting upwardly from the base of the riser chamber.

Preferably the depth of molten glass in the riser chamber is at least twice the height of the electrodes in the riser chamber.

The invention also provides a glass melting tank for continuous supply of molten glass to an outlet at a downstream end of the tank, which tank comprises a melting chamber at an upstream end of the tank, a refining chamber, a riser chamber between the melting and refining chambers, said melting chamber having heating means for melting batch material to produce molten glass and an outlet for molten glass adjacent a base of the melting chamber at a downstream end of the chamber, a throat connecting said outlet to an inlet at a base of said riser chamber arranged to receive molten glass from said melting chamber, said riser chamber having an outlet at its upper end coupled to said refining chamber in which the molten glass is refined, said riser chamber having heating means to raise the temperature of the molten glass and chamber walls including an upstream wall adjacent the inlet from the throat and a downstream wall adjacent the outlet to the refining chamber, together with means to cool both said upstream and downstream walls and heating electrodes projecting upwardly from the base of the riser chamber for immersion in molten glass in the riser chamber, said electrodes being located in a central zone of the base of the riser chamber and spaced from the chamber walls of the riser chamber whereby an inhomogeneous temperature distribution is formed in the glass across the riser chamber and molten glass is caused to flow upwardly in said central zone of the riser chamber with downward glass flow adjacent said chamber walls and surrounding said upward glass flow, the heating means in the riser chamber being arranged such as to raise the temperature of the glass in the riser chamber and to maintain a glass temperature adjacent the base of the riser chamber opposite said throat which is above the temperature of glass entering the riser chamber through the throat.

Preferably said riser chamber has upstream and downstream chamber walls spaced respectively from the melting chamber and refining chamber thereby providing air spaces acting as cooling means for said upstream and downstream walls of the riser chamber.

Preferably a first temperature detector is located adjacent the downstream end of the riser chamber for detecting temperature of molten glass adjacent the base of the riser chamber.

Preferably a second temperature detector is located in said throat for detecting temperature of molten glass passing through the throat.

Preferably the electrodes in the riser chamber have a height not exceeding one half the depth of glass in the riser chamber.

The aforesaid methods and apparatus of the invention are particularly applicable to the supply of molten glass for the production of high quality flat glass, including for example float glass.

BRIEF DESCRIPTION OF THE DRAWINGS

FIG. 1 is a plan view of a glass melting tank in accordance with the present invention, FIG. 2 is a vertical section through the glass melting tank of FIG. 1, FIG. 3 is a view similar to FIG. 2 of a different embodiment of the invention, and FIG. 4 is a view similar to FIG. 2 of yet another embodiment of the invention, and FIG. 5 is a graph showing temperature variation of forward flowing glass along the length of the tank shown in FIGS. 1 and 2.

DESCRIPTION OF THE PREFERRED EMBODIMENTS

In this example the glass melting tank comprises a melting chamber 11, a refining chamber 12 and a conditioning chamber 13. A riser chamber 14 is located between the melting chamber 11 and the refining chamber 12. The tank is suitable for use in producing high quality flat glass such as float glass.

In use solid batch material for producing glass is supplied through a system such as a hopper system to the top of the melting chamber 11 so that a blanket of solid batch material 15 lies on top of molten glass 16 in the melting chamber. Heat is supplied to the melting chamber 16 by an array of electrodes 17 which are mounted on the base 18 of the melting chamber and project vertically upwards so as to be immersed in the molten glass 16. An electrical supply 19 is connected to the electrode and controlled by a control unit 20. Molten glass flows out of the melting chamber 11 through a centrally located exit 21 in the base 18 of the melting chamber adjacent a downstream wall 22 of the melting chamber. The exit 21 leads to a submerged throat 23 leading centrally into the lower part of the riser chamber 14. A thermocouple 24 is mounted in the base of the throat 23 so as to detect the temperature of molten glass in the throat 23. The thermocouple 24 is connected to the control unit 20.

The riser chamber 14 is provided with an array of electrodes 25 which are mounted on a base 26 of the riser chamber and project vertically upwards so as to be immersed in the molten glass in the riser chamber. The electrodes 25 are arranged to increase the temperature of forward flowing glass so that on leaving the riser 14 the forward flowing glass is at a suitable refining temperature higher than the temperature of the glass entering through the throat 23. The electrodes 25 are located in a central zone of the riser chamber 14 and are spaced from all four walls (upstream wall 28, downstream wall 29 and opposite side walls 30 and 31 of the riser chamber). In this way no heat is supplied to the molten glass in the riser chamber in the region of any of the walls of the chamber. The electrodes 25 are connected to the power supply 19 and, like the electrodes 17, are arranged to heat the molten glass by the Joule effect. A thermocouple 32 is mounted in the base 26 of the riser chamber close to the downstream wall 29 opposite the throat 23 so as to detect the temperature of molten glass at the bottom of the riser chamber in the region close to the downstream wall 29. The thermocouple 32 is coupled to the control unit 20 so as to control the power supplied to the electrodes 25 in dependence on the temperature detected by the thermocouples 24 and 32. The control 20 provides control of the power supplied to the electrode 25 in the riser chamber 14 independently of the control of the power supplied to the electrode 17 in the melting zone 16. The walls of each chamber in the melting tank are formed of refractory material so as to withstand the molten glass in the tank. The arrangement in the riser chamber 14 is however arranged to minimise corrosion effects from glass passing through the riser chamber from the melting tank chamber 16 to the refining chamber 12. The upstream wall 28 of the riser chamber is spaced from wall 22 of the melting chamber so as to provide an air space 35 which acts as a cooling means for the upstream wall 28 of the riser chamber. Similarly the downstream wall 29 of the riser chamber is separated by an air space 36 from the upstream wall 37 of the refining chamber 12. This air space 36 acts as a cooling means to cool the downstream wall 29 of the riser chamber. The two side walls 30 and 31 of the riser chamber are not facing heated chambers such as the melting and refining chambers and thereby permit sufficient cooling of the sides of the riser chamber. By arranging for the air spaces 35 and 36 to cool the upstream and downstream walls of the riser chamber and by locating the electrodes 25 so that the heat input in the riser chamber is confined to a central region well spaced from the side walls of the riser chamber, convective flows are formed in the glass passing through the riser chamber as shown in FIG. 2. The result is a toroidal flow pattern in which glass in the central region of the riser chamber is caused to flow upwardly surrounded by an annular pattern of downwardly flowing glass adjacent the walls of the riser chamber. In this way, glass entering the riser chamber through the throat 23 may rise in the central flow together with recirculated glass which has descended adjacent the walls of the riser chamber and then ascends in the central upward flow path. The glass which rises in the central region is then divided so that some passes over a weir 39 leading into the refining chamber 12 whereas the remainder is recirculated within the riser chamber in the toroidal pattern. By use of this system, the glass which flows forwardly over the weir 39 into the refining chamber has risen through the riser chamber out of contact with the refractory walls of the chamber and therefore has a much reduced likelihood of contamination from corrosion with the side walls. The glass which flows downwardly .against the side walls is cooled by virtue of the cooling effect of the air spaces 35 and 36 thereby reducing the likelihood of corrosion with the side walls and any contamination which does result may be reduced as the glass rerises in the hotter central flow as it is recirculated upwardly through the riser chamber. The thermocouples 24 and 32 are operable to control the heat input from the electrode 25 so as to ensure that there is no build-up of cold glass at the bottom of the riser chamber, particularly starting adjacent the downstream wall 29. Any such build-up of colder glass could gradually restrict the throat 23 causing the forward flowing glass to have a higher velocity on entering the riser chamber and thereby increasing the likelihood of corrosion at the foot of the wall 28 on entering the riser chamber. To minimise corrosion in the riser chamber it is important to avoid glass which enters from the throat 23 rising immediately adjacent the wall 28. Due to the direction of flow through the glass melting tank as a whole the likelihood of corrosion in the riser chamber is greatest on the upstream and downstream walls 28 and 29 but this risk is reduced by the toroidal flow pattern where the cooler downward flowing glass engages these walls. The control effected via the thermocouple 32 is used to ensure that the temperature of molten glass near the base of the riser 14 adjacent the downstream wall 29 and opposite the throat 23 is always higher than the temperature of the glass passing the thermocouple 24 in the throat 23. To achieve the correct temperature distribution in the riser 14 the electrodes 25 are arranged to input heat in the lower part of the riser chamber 14. The height of the electrodes 25 is between 20% and 50%, preferably 30% and 40% of the depth of molten glass in the riser chamber 14. This provides sufficient heat input at the lower part of the riser chamber 14 to avoid a build up of cold glass at the bottom of the chamber 14. In a preferred arrangement, the electrodes 25 are spaced from the walls of the riser chamber 14 by a distance at least as great as the height of the electrodes 25. The lateral spacing between a pair of electrodes 25 may equal the sum of the width of the throat 23 and the height of the electrodes 25. The forward spacing between rows of the electrode 25 may be between 0.8 and 1.4 times the height of the electrodes 25. The ratio of the volume V of glass in the riser chamber 14 to the glass load L passing through the tank is preferably in the range 1.25 to 2.5 m$^3$hr/tonne. The electrical power required in the riser chamber 14 is typically in the range 40 to 60 kw/m$^3$. The power density for the molybdenum electrodes 25 is typically in the range 20 to 40 kw/dm$^3$ of immersed molybdenum electrodes.

After passing over the weir 39 into the refining chamber the molten glass is further heated so as to reduce contamination from impurities and also to release bubbles. The glass may recirculate as shown by the arrows in the chamber 12 so that the forward flowing glass is in the upper part of the refining chamber with a colder return flow at the bottom of the chamber. Additional heat is applied above the molten glass in the riser chamber 14 and refining chamber 12 by gas burners operating through ports such as those marked at 40 and 41.

The glass melting tank is formed with a waist 43 adjacent the junction between the refining chamber 12 and conditioning chamber 13.

A barrier in the form of a transverse water-cooled pipe 44 extends across the waist and is submerged in the upper forward flowing path of the molten glass. The pipe is water-cooled so as to reduce the temperature of glass entering the thermal conditioning zone 13 and reduces the rate of flow of hot glass out of the refining chamber 12 thereby ensuring that the glass is held for a sufficient time in the refining chamber 12 for satisfactory refining to occur. The effect of the water pipe 44 does cause some glass to flow downwardly at that point joining a return flow at the base of the refining chamber 12. An array of stirrers 45 which may also be water-cooled are located adjacent the water pipe 44 on the downstream side of the pipe. The pipe 44 and stirrers 45 may improve the temperature and homogeneity of the glass entering the conditioning zone 13. The zone 13 is not normally heated and the temperature of the glass is gradually reduced on flowing through the conditioning zone 13 towards an outlet 48 leading to a glass forming process. The outlet 48 is positioned in the upper part of a downstream wall 49 of the conditioning zone so that only forward flowing glass in the upper part of the conditioning zone 13 leaves through the outlet 48. The lower levels in the conditioning zone may be recirculated as a return flow at the lower part of the conditioning zone and passed back through the refining zone for further refinement before leaving through the outlet 48.

As explained above, the riser chamber 14 in this example is used to raise the temperature of forward flowing glass and is not used for controlled cooling. A graph showing the typical temperature pattern of forward flowing glass passing through the melting tank is shown in FIG. 5. The temperature T1 of glass leaving the melting chamber 23 may fall slightly on passing through the throat 23 and enter the riser chamber 14 at a temperature T2 insufficient for effective refining. The heat input in the riser chamber 14 exceeds the cooling effect so that the temperature T3 of glass leaving the riser chamber 14 over the weir 39 is at a suitable refining temperature higher than T2. On passing through the refining chamber 12 the forward flowing glass cools to temperature T4 but is always above T2 and sufficient to effect refining. On passing through the waist 43 the temperature drops to T5 and controlled cooling to an outlet temperature T6 is effected on passing through the conditioning chamber 13.

The invention is not limited to the details of the foregoing example.

In particular, the refining and conditioning zones of the unit may be designed to operate with various flow regimes in the molten glass.

Alternatives to the above example are shown in FIG. 3 and FIG. 4. FIG. 3 shows that the downstream conditioning zone 50 is much shallower than the refining zone 12. This creates a situation in which there is only forward flow in the glass beyond the waist 43. In this manner more efficient use can be made of the area available for conditioning e.g. to enable higher glass loading.

The deeper refining zone 12 continues to operate with return flows in the glass generated by the cooling effects of the water-cooled barrier 44 and stirrers 45 in the waist and of the refiner end wall. The amount of return flow is reduced compared with the full depth refining and conditioning and this produces greater thermal efficiency.

FIG. 4 shows that the refining zone 51, waist 43 and conditioning zone 50 are all of a similar shallow depth to that illustrated by FIG. 3. Under these conditions, there is only forward flow present in the glass beyond the riser zone 14. This reduces the energy requirement by virtue of not having to reheat return flows. The waist section 43 retains a shallow water pipe 44 to impede the surface flow leaving the refining zone. The refining zone 51 can be heated either by above-glass burners 41 or by below glass electric heating or by a combination of the two methods.

It will further be understood that, if desired, molten glass could be fed to the riser chamber through a plurality of throats, for example from a plurality of melting chambers. Such throats may be through different walls of the riser chamber which need not be of rectangular form and could have a number of walls other than four. A plurality of riser chambers 14 may be provided each supplied by a respective throat. A plurality of risers may be used and may be connected to a common conditioning chamber.

We claim:

1. A glass melting tank for continuous supply of molten glass to an outlet at a downstream end of the tank, which tank comprises (a) a melting chamber at an upstream end of the tank having heating means for melting batch material to produce molten glass and an outlet for molten glass adjacent a base of the melting chamber at a downstream end of the melting chamber, (b) a refining chamber for refining molten glass, (c) a riser chamber located between the melting and refining chambers, (d) a throat connected to said outlet of the melting chamber, said riser chamber having a base, walls including a cooling upstream wall and a cooling downstream wall, an outlet at its upper end coupled to said refining chamber, an inlet coupled to said throat, heating electrodes projecting upwardly from the base of the riser chamber for immersion in molten glass in the riser chamber, said electrodes being located in a central zone of the base of the riser chamber and spaced from said walls of the riser chamber, a first temperature detector located in the riser chamber downstream of the electrodes for detecting temperature of molten glass adjacent the base of the riser chamber, and a second temperature detector located upstream of said electrodes for detecting temperature of molten glass passing through the throat into the riser chamber means for cooling both said upstream and downstream cooling walls of said riser chamber, whereby an inhomogeneous temperature distribution is formed in the glass across the riser chamber and molten glass is caused to flow upwardly in said central zone of the riser chamber with downward glass flow adjacent said chamber walls and surrounding said upward glass flow, so that glass entering the riser chamber through the throat may rise in central flow together with recirculated glass that has descended in the downward outer glass flow, said first and second temperature detectors being operable to control a heat output of the electrodes in the riser chamber so as to raise the temperature of the glass in the riser chamber to maintain a glass temperature adjacent the base of the riser chamber downstream of said electrodes which is above the temperature of glass entering the riser chamber through the throat thereby preventing a throat-restricting buildup of cold molten glass at the bottom of the riser chamber.

2. A glass melting tank according to claim 1 further comprising control means coupled to said first and second temperature detectors and arranged to control power supply to said electrodes in the riser chamber so as to maintain required glass flow within the riser chamber.

3. A glass melting tank according to claim 1 wherein said heating electrodes project upwardly from the base of the riser chamber to a height not exceeding half the depth of molten glass in the riser chamber.

4. A glass melting tank according to claim 3 in which the electrodes are spaced from said walls of the riser chamber by a distance at least equal to the height of the electrodes.

5. A glass melting tank according to claim 1 in which the electrodes in said riser chamber comprise an array of electrodes with at least two electrodes spaced laterally across the riser chamber and at least two electrodes spaced longitudinally along the chamber.

6. A glass melting tank according to claim 1 in which said upstream and downstream chamber walls of the riser chamber are spaced respectively from the melting chamber and refining chamber thereby providing air spaces acting to cool said upstream and downstream walls of the riser chamber.

7. A glass melting tank according to claim 1 further comprising a conditioning chamber connected to said refining chamber for thermally conditioning the glass prior to flowing through an outlet at the downstream end of the tank.

8. A glass melting tank according to claim 7 wherein cooling means are arranged to extend transversely across the upper region of forwardly flowing molten glass adjacent an inlet to the conditioning chamber.

9. A glass melting tank according to claim 8 in which said cooling means comprise a water cooled pipe.

10. A glass melting tank according to claim 8 further including stirring means located in the path of forward flowing glass adjacent the conditioning chamber.

11. A glass melting tank according to claim 1 wherein said melting chamber is an electric melting chamber having an array of electrodes mounted in a lower part of the melting chamber for supplying heat to molten glass beneath batch material lying on top of the molten glass.

* * * * *